Patented May 15, 1951

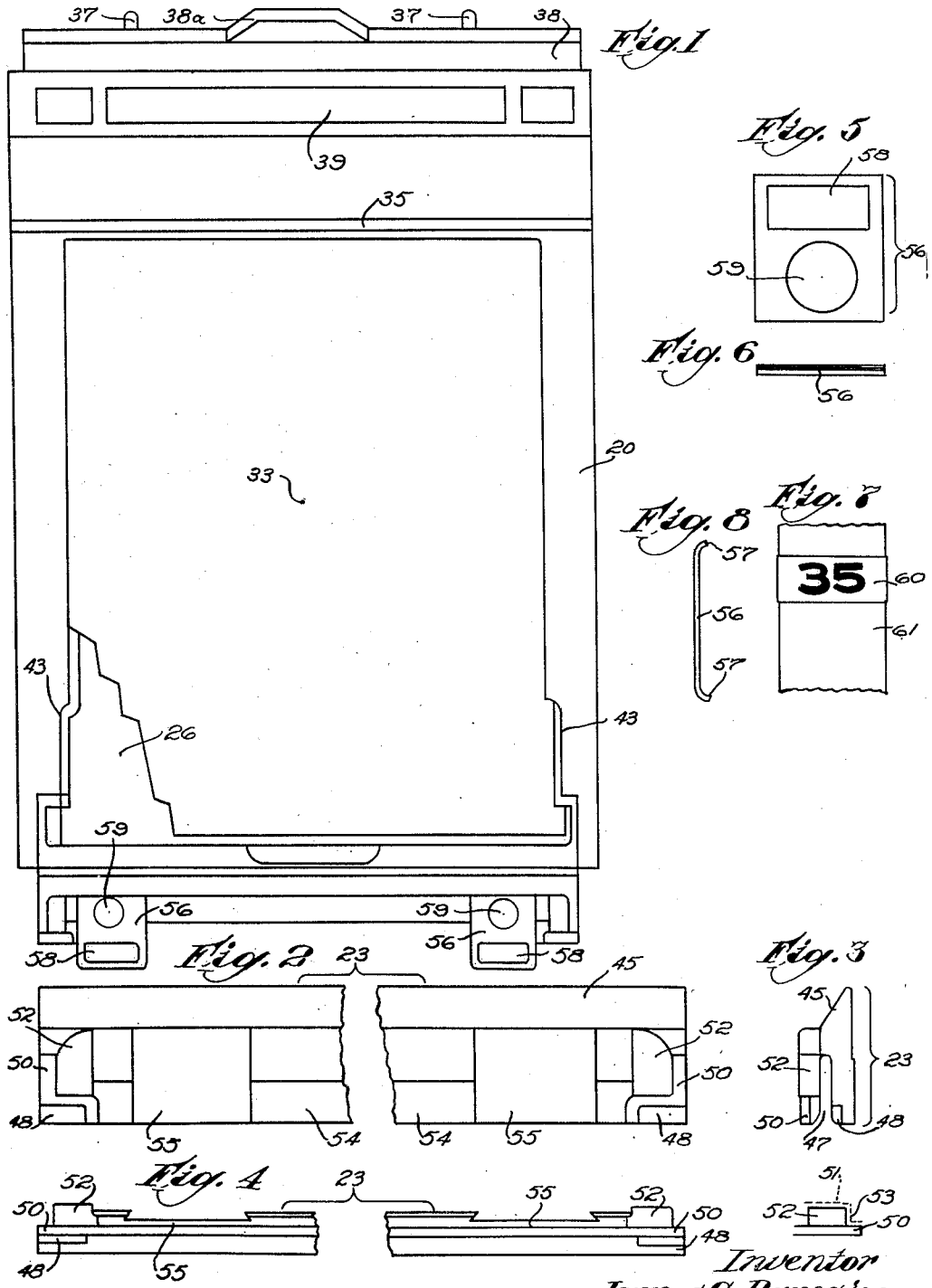
May 15, 1951     J. S. PANOSIAN     2,552,905
FILM IDENTIFYING MEANS FOR PHOTOGRAPHIC CAMERA FILM HOLDERS
Original Filed Jan. 3, 1948

2,552,905

UNITED STATES PATENT OFFICE 2,552,905

FILM IDENTIFYING MEANS FOR PHOTOGRAPHIC CAMERA FILM HOLDERS

James S. Panosian, Rochester, N. Y., assignor to Graflex, Inc., Rochester, N. Y., a corporation of Delaware Original application January 3, 1948, Serial No. 463, now Patent No. 2,497,270, dated February 14, 1950. Divided and this application December 14, 1949, Serial No. 132,913

19 Claims. (Cl. 95—66)

This application is a division of my co-pending application Ser. No. 463, filed January 3, 1948, now Patent Number 2,497,270.

This invention relates to film identifying means for photographic camera film holders.

In order that the principle of the invention may be readily understood, I have disclosed a single embodiment thereof in the accompanying drawings, wherein Fig. 1 is a front plan view of a photographic camera film holder having my film identifying means, marking device or member applied thereto;

Fig. 2 is an inside elevation, partly broken away, of the flap or cover member of the film holder whereon my film identifying means, marking device or member is adapted to be positioned;

Fig. 3 is a right-hand end view of Fig. 2;

Fig. 4 is a bottom view of Fig. 2 partly broken away;

Fig. 5 is a top plan view of the film identifying means, marking device or member;

Fig. 6 is a transverse sectional view through Fig. 5;

Fig. 7 represents a portion of a roll of transparent adhesive tape having a series of film identifying numbers that may be cut therefrom; and Fig. 8 is a vertical edge view of the construction shown in Fig. 5.

There has been developed in the last few years sensitized material of much greater light sensitivity than heretofore. Because of this increased light sensitivity of the sensitized material, it has become increasingly difficult to manufacture a film holder that is light-tight under all operating conditions. Nevertheless the film holder constituting my invention not only meets the conditions for preventing light leaks in the film holder, but at the same time provides a structure that is unusually simple to manufacture and that can be built at reasonable cost. The structural members of the film holder are moldings that can be reproduced either in metal or in several of the well known plastic materials.

The principal object of the invention disclosed and claimed in this divisional application is to provide means for readily identifying film exposed in the holder.

The internal construction of the film holder, with the exception of the part to which my invention particularly relates, is not herein fully shown. The said film holder is, however, preferably formed of two mating castings, one of which is shown at 20, in Fig. 1, fastened together by pins. At the lower end of each of said castings is pivoted a flap or hinged cover member 23 used for loading sensitized material into the film holder, and the internal construction thereof is such as to provide support for the film identifying means herein fully disclosed and claimed. Between said two castings is fitted a suitable separator plate received in grooves in said castings, the said separator plate being provided at its upper end with a light valve or seal, not herein shown.

Integral with the two castings of the holder are cast keys, one of which is shown at 35, Fig. 1, and which serve to retain the holder in the camera and also to provide an additional light lock. The holder is provided at the upper end with a cross member which forms a guide for the dark slides, one of which is indicated at 33, being broken away at the lower left-hand corner to show a part of the separator plate 26. Into the said cross member are threaded dark slide locks 37, 37, shown in Fig. 1. To the upper end of each of the dark slides 33 is fitted a metal handle 38 formed with a loop 38a. The upper portion of the two castings is of a channel construction, indicated at 39, to form a handle-like recessed construction for removing the holder from the camera.

The said separator plate has two septums respectively attached to the opposite faces thereof as by spot welding, riveting or cementing. The said septums are desirably provided with curled-over ends and sides for holding the sensitized material. The said curled-over sides of the septums also form guides for the two dark slides 33 and a suitable lip or extending portion of the two castings respectively form an outer guide for the said dark slides 33. The lower ends of the two castings of the film holder are provided, as shown in Fig. 1, with cut-outs, indicated at 43, to provide an easy means for inserting sheet film in the said two septums.

In Fig. 2 is shown an inside plan view of one of the lower flaps or hinged members 23 that are each made as a molding and are of identical but reverse construction.

An end view of one of said flaps or hinged members 23 is shown in Fig. 3, and a top view thereof in Fig. 4.

The flap or hinged member construction is not herein fully disclosed nor claimed per se, being fully disclosed and claimed in a companion divisional application of the said parent application Ser. No. 463. I will, however, here sufficiently refer to certain features thereof, because of the fact that the film identifying means, devices or members are respectively supported upon the said hinged flaps or members.

The outer face of the bottom portion of each of the two castings of the film holder is cut away at a suitable angle, and the corresponding flap or member 23 is also constructed with a mating angle indicated at 45 in Figs. 2 and 3. An angle of thirty degrees, to which the invention is not limited, has been found in practice to be completely effective for the angle in question. The said flaps or members 23 are secured to the lower end of the holder by a strip of suitable flexible material extending across and adhesively secured to the lower end of the holder and thus providing a hinge permitting the two flaps or members to be folded entirely back against the lower end of the holder without in any way injuring the said hinge. This provides a longer wearing hinge and makes it considerably easier to load the holder.

Each flap or hinge member 23 is provided with a groove 47, shown in Fig. 3, for receiving the corresponding dark slide 33 and an additional step 48 for engaging the notch in the holder casting, shown in Fig. 1.

As shown in Figs. 2, 3 and 4 a second step 50 is provided in each of the flaps or members 23 that engages a mating cut-out or step 51 indicated at the extreme right of Fig. 4 in dotted lines, in each of the said castings. Said illustration at the extreme right of Fig. 4 constitutes a part of such figure.

A boss 52 is provided on each of the said flaps or members 23 for engagement with a correspondingly shaped recess or depression 53, indicated at the extreme right of Fig. 4, and provided in each of the said castings. The said septums serve as one wall of each such recess.

A recess or step is provided in each of the flaps or members 23 at the top of the inner face thereof to engage the lower ends of the sheet films when the flaps are in closed position.

I will next refer to the novel film identifying or marking device or member to which this invention is particularly directed.

I have for this purpose provided in each of the hinged flaps or members, recesses or slots, indicated at 55, 55 in Figs. 2 and 4, being therein, as an example, shown of a dovetail construction, but to which shape or construction my invention is not limited. The said recesses or slots 55, 55 are for the purpose of receiving the film identifying devices or members, one of which is indicated at 56, and which are shown in place in Fig. 1, and one form of the construction of which is most clearly shown in Figs. 5 to 8, but to which form my invention is not limited.

In Fig. 5, wherein the construction is inverted from that shown in Fig. 1, is shown a top plan view of the film identifying or marking device or member 56 which is a clip made of either metal or a plastic material, and the upper and lower ends of which may, if desired, be provided with legs or bent-over portions 57 for engaging the said recesses or slots 55 of the two hinged flaps or members 23, herein shown as dovetailed.

In the film identifying or marking device, I may if desired provide an opening 58 into which will be applied a number or other indicating notation and a second hole 59 that may be of any suitable shape. The said film identifying or marking device can be readily inserted into said recesses or slots 55, or be readily removed therefrom, whether or not said recesses or slots be dovetailed. When in place, the structure will appear as in Fig. 1. My invention is not, however, limited to the illustrated form of film identifying or marking device.

To provide convenient means of changing numbers as applied to the film identifying or marking device 56, a number, such as 35 shown at 60 in Fig. 7, can be cut from a roll of transparent material having suitable numbers which may be made up in any suitable manner so as, for example, to provide numbers from 1 to 50 or 1 to 100. The transparent material may also be supplied in sheets having numbers that can be cut out therefrom. In the embodiment shown, to which my invention is not limited, the numeral 35 is laid over the opening 58 of the film identifying or marking device 56 and held thereto by a small piece of transparent adhesive tape 61, and when the number-holding film identifying or marking member 56 is properly located in either of said recesses or slots of either of the flaps 23, slight pressure by the finger over the opening 59 will depress the adhesive tape through such opening 59 into contact with the flap body, thus securely holding the film identifying or marking device in place.

Any suitable form of numbers can be used. For example, as shown in Fig. 7, the number is opaque and the surrounding area is transparent. The numbering device may, in accordance with my invention, be made in the reverse manner, having a transparent number surrounded by an opaque background. A fluorescent material may be used for applying the numbers either of the type requiring activation by exposure to light or activation by radioactive bombardment. The described structure provides a novel numbering system wherein the type of numbering used is that applied by light coming through the lens on the exposure or by fluorescent illumination, or by both.

In Fig. 1, one of the hinged flaps or members 23 is shown in the open position. Therefore, the film identifying or marking device or member 56 is not in contact with the film. However, when such hinged flap or member is in closed position, the film identifying or marking devices 56 are in contact with the sensitized material, and when an exposure is made, the dark slide 33 is withdrawn and the number or other identifying means will be printed on the sensitized material, either because of the light coming through the lens in making the exposure or if a fluorescent type of material is used, the exposure on the film will commence as soon as the hinged flap or member 23 is closed.

The structure herein disclosed differs radically from that disclosed in the patent to Smith and Whitman, No. 2,326,075, August 3, 1943 (belonging to the same assignee) and the purpose of the present invention is different. In said patent, the tabs 32, 32a, as shown in Fig. 21 thereof, are permanently attached to the holder moldings at the upper end of the exposure area thereof. Each tab is merely a small flat piece having a transparent portion formed as a numeral, but which the specification of the patent states may be the initials of the operator or some other pertinent data. Such data is always the same and is light printed onto every film exposed in that holder. In my invention, as herein set forth, I provide a roll or package of transparent material having a series of numbers thereon as, for example, 1 to 50 or 1 to 100. The material is severed between the numbers, which are individually used in successive films so that the successive films respectively bear printed thereon numbers varying, say, from 1 to 50 or 1 to 100. These small transparent pieces cut from the roll or package are individually placed for successive films under the film-identifying device 56, shown best in Figs. 5 and 8, then a small piece of transparent adhesive tape 61 is applied, and the operator presses it with a finger tip to depress the adhesive tape into contact with the flap body, after which the hinged flap 45 is turned back into its normal position, to receive the lower edge of the film in the slot 47, and the holder is ready for use.

The sensitized material holder herein disclosed is very economical to manufacture and the holder is absolutely light-tight.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic film or like holder having at an edge thereof which is near an edge of a sensitized sheet when in position in said holder, a member constituting a part of the holder, which is hinged to the body of the holder so that it is capable of being swung outwardly away from the face of the body of the holder so as to expose its own inner face, said hinged member at such inner face thereof having a shallow depression of a size and shape to receive removably a film identifying sheet-like device, in combination with said film identifying device, the said film identifying device being a small sheet-like member of substantial thickness received flatwise and readily removable in said depression, so as to be retained therein while the exposure of the sensitized sheet is being made, after the said hinged member has been returned to closed position, and which film identifying device is constructed to receive flatwise a smaller piece of transparent material which itself has an identifying notation.

2. A film or like holder in accordance with claim 1, wherein the said film identifying device has an opening therethrough over which said smaller piece of transparent material bearing an identifying notation is adapted to be received.

3. A film or like holder in accordance with claim 1, wherein the said film identifying device has an opening therethrough over which said smaller piece of transparent material bearing an identifying notation is adapted to be received, and a small piece of adhesive tape adapted to be received over and to confine in position the said piece of transparent material that bears the identifying notation.

4. A film or like device in accordance with claim 1, wherein said sheet-like member has an opening therethrough over which said smaller piece of transparent material is adapted to be received, and is also provided with a second opening through which finger pressure may be applied, and wherein a small piece of adhesive tape is adapted to be received over and to confine in position the said piece of transparent material that bears the identifying notation, and which small piece of adhesive tape may be pressed by such finger pressure through said second opening, into contact with the underlying surface of said hinged member.

5. A film or like holder in accordance with claim 1, wherein two opposite edges of the said film identifying sheet-like member are bent from the plane of the body of such sheet-like member to engage the edge of the depression in the hinged member in which the sheet-like member is received, but so as to permit said sheet-like member to be readily removed from said depression.

6. A photographic film or like holder having at an edge thereof which is near an edge of a sensitized sheet when in position in said holder, a member constituting a part of the holder, that is hinged to the body of the holder so that it is capable of being swung outwardly away from the face of the body of the holder so as to expose its own inner face, said hinged member at such inner face thereof having a shallow depression of a size and shape to receive removably a film identifying sheet-like device, in combination with said film identifying device, the said film identifying device being a small sheet-like member of substantial thickness received flatwise and readily removable in said depression, so as to be retained therein while the exposure of the sensitized sheet is being made, after the said hinged member has been returned to closed position.

7. A photographic film or like holder in accordance with claim 1, wherein the said hinged member that receives upon its inner face the film-identifying device is hinged at the bottom of the holder, so that it may be swung outward to receive in the depression in its inner face the said film identifying device, and then may be swung back into normal position against the body of the holder.

8. A film identifying device constructed to be detachably received in a correspondingly shaped depression of a photographic film or like holder, which depression faces and is in close proximity to the sensitized sheet or film when in position and the holder is in use, said film identifying device consisting of a small piece of sheet-like material having an opening therein, and a second piece of smaller size made of transparent material and bearing an identifying notation which is adapted to be positioned flatwise over said opening in the first mentioned piece of sheet-like material, so that when the entire device is positioned flatwise with respect to and close to the positioned sensitized film, the exposure when made will cause the identifying notation to be reproduced upon the sensitized film or like sensitized surface.

9. A film identifying device in accordance with claim 8, wherein the first mentioned piece of sheet-like material is provided with a second through-opening for the application of finger pressure to a notation bearing piece of material.

10. A film identifying device in accordance with claim 8, wherein there is provided an adhesive tape to be applied against the said second piece of material having an identifying notation, to secure it in position over the opening in the first mentioned piece of sheet-like material.

11. A film identifying device in accordance with claim 8, wherein opposite edges of the first mentioned piece of sheet-like material are bent in the same direction, away from the plane of the surface of said piece of sheet-like material, for the purpose of engaging edges of the said receiving depression in the film or like holder.

12. A film identifying device in accordance with claim 8, wherein the first mentioned small piece of sheet-like material is made of metal.

13. A film identifying device in accordance with claim 8, wherein the first mentioned small piece of sheet-like material is made of plastic material.

14. A film identifying device in accordance with claim 8, wherein the said small piece of transparent material bearing an identifying notation is made of fluorescent material.

15. A photographic film or like sensitized sheet holder having a film-holding flap hingedly mounted at one edge of the holder, to permit placement of the film or the like in the holder and its removal therefrom, and means for securing a film identifying device to the inside face of the said flap, so that when said flap is closed to film-holding position, the film identifying device overlies part of the film or like sensitized sheet.

16. A photographic film or like sensitized sheet holder having a film-holding flap hingedly mounted at one edge of the holder, to permit placement of the film or the like in the holder and its removal therefrom, and a readily removable film identifying device detachably applied to the inside face of the said flap, whereby, when the said flap is closed to film-holding position, the said film identifying device overlies part of the film or like sensitized sheet, and whereby the said device may be readily removed from its said functioning position and another film identifying device substituted.

17. A photographic film or like sensitized sheet holder having a film-holding flap hingedly mounted at one edge of the holder, to permit placement of the film or the like in the holder and its removal therefrom, and a film identifying device removably applied to the inside face of such flap and itself having means for substituting a different identifying notation as a part of said film identifying device.

18. A film identifying device for removable application to a surface of a photographic film or like holder that, when in functioning position, closely overlies the sensitized surface that has been placed in such holder, said identifying device being a removable clip having an opening therein through which an applied indicating element is visible, the said clip being securable to the film holder in such position as to cause said indicating element to overlie closely a part of the positioned film or like sensitized surface.

19. A film identifying device for removable application to a surface of a photographic film or like holder that, when in functioning position, closely overlies the sensitized surface that has been placed in such holder, said identifying device being a removable clip having two openings therein, through one of which an applied indicating element is visible, the other opening being provided to permit manual pressing of the identifying element into functioning position.

JAMES S. PANOSIAN.

REFERENCES CITED

The following references are of record in the file of this patent:

UNITED STATES PATENTS

| Number | Name | Date |
|---|---|---|
| 2,203,912 | Levin | June 11, 1940 |
| 2,326,075 | Smith et al. | Aug. 3, 1943 |